US008575877B2

(12) United States Patent
Liu

(10) Patent No.: US 8,575,877 B2
(45) Date of Patent: Nov. 5, 2013

(54) SOLAR-POWERED WINDOW COVERING AUTOMATION SYSTEM

(75) Inventor: Alex Liu, Nanjing (CN)

(73) Assignee: BTX Holdings, L.L.C., Dallas, TX (US)

(*) Notice: Subject to any disclaimer, the term of this patent is extended or adjusted under 35 U.S.C. 154(b) by 416 days.

(21) Appl. No.: 12/808,482

(22) PCT Filed: Dec. 16, 2008

(86) PCT No.: PCT/US2008/086974

§ 371 (c)(1),
(2), (4) Date: Oct. 19, 2010

(87) PCT Pub. No.: WO2009/079501

PCT Pub. Date: Jun. 25, 2009

(65) Prior Publication Data

US 2011/0162809 A1 Jul. 7, 2011

(30) Foreign Application Priority Data

Dec. 17, 2007 (AU) ................................ 2007906910

(51) Int. Cl.
*H02P 1/04* (2006.01)

(52) U.S. Cl.
USPC ........... 318/480; 318/560; 318/640; 318/577; 318/576; 250/200; 323/221; 323/902

(58) Field of Classification Search
USPC .......... 318/480, 560, 640, 577, 576; 250/200; 323/221, 902
See application file for complete search history.

(56) References Cited

U.S. PATENT DOCUMENTS

| | | | | |
|---|---|---|---|---|
| 5,056,179 | A * | 10/1991 | Capponi | 15/105 |
| 5,413,161 | A * | 5/1995 | Corazzini | 160/7 |
| 5,760,558 | A * | 6/1998 | Popat | 318/480 |
| 5,793,174 | A * | 8/1998 | Kovach et al. | 318/468 |
| 5,990,646 | A * | 11/1999 | Kovach et al. | 318/468 |
| 6,057,658 | A * | 5/2000 | Kovach et al. | 318/16 |
| 6,181,089 | B1 * | 1/2001 | Kovach et al. | 318/16 |
| 6,259,218 | B1 * | 7/2001 | Kovach et al. | 318/16 |
| 6,369,530 | B2 * | 4/2002 | Kovach et al. | 318/16 |

(Continued)

*Primary Examiner* — Rita Leykin

(74) *Attorney, Agent, or Firm* — Shaukat A. Karjeker; Carstens & Cahoon, LLP

(57) ABSTRACT

A solar-powered automated system for the operation of drapery, roller blinds, and similar window coverings. The solar panel (102), or photovoltaic source provides the sole power to drive common types of window drapery and blinds in a compact system having a solar panel (photovoltaic source), actuator (104) and head rail (120). The solar panel (102) is to be mounted onto the frame of a window or elsewhere to collect sufficient light. A connecting cable links the solar panel (102) to the actuator (104) to draw electrical power from the solar panel. The actuator is attached to the head-rail (120) to provide the required driving force. The actuator (104) includes the control circuit boards, a single rechargeable battery (110), an electric motor (106) and output mechanism. An RF remote control receiver (116) is built inside the actuator (104). A low voltage control port (114) allows the actuator (104) to be accessible by a control interface. The control circuit comprises a standby circuit (111) and a boosting circuit (108). The standby circuit (111) operates at the battery voltage level and consumes minimum power to save energy when the system is not in use. The boosting circuit (108) is only activated when the actuator (104) drives the window covering, and works only during the time span of such activity. The head rail (120) houses the necessary members for transmitting the driving force to the drapery for open/close operation. It can also be a rotary type for a roller blind.

6 Claims, 6 Drawing Sheets

(56) References Cited

U.S. PATENT DOCUMENTS

| | | | | |
|---|---|---|---|---|
| 6,484,069 | B2 * | 11/2002 | Osinga | 700/275 |
| 6,732,018 | B2 * | 5/2004 | Osinga | 700/275 |
| 6,781,335 | B2 * | 8/2004 | Osinga et al. | 318/445 |
| 6,984,951 | B2 * | 1/2006 | Osinga et al. | 318/400.11 |
| 7,081,739 | B2 * | 7/2006 | Osinga et al. | 323/222 |
| 7,389,806 | B2 * | 6/2008 | Kates | 160/5 |

* cited by examiner

Figure 4C:
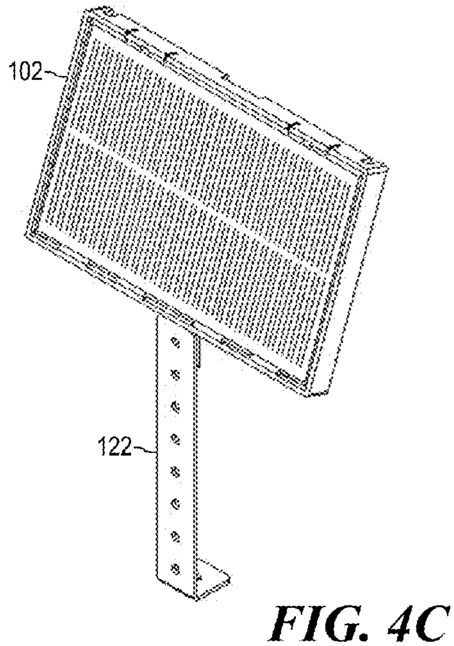
Figure 4E:
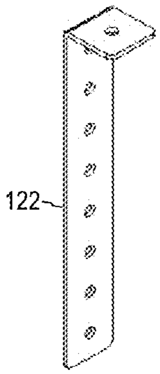
Figure 4F:
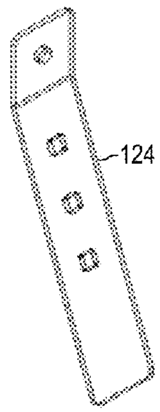
Figure 4D:
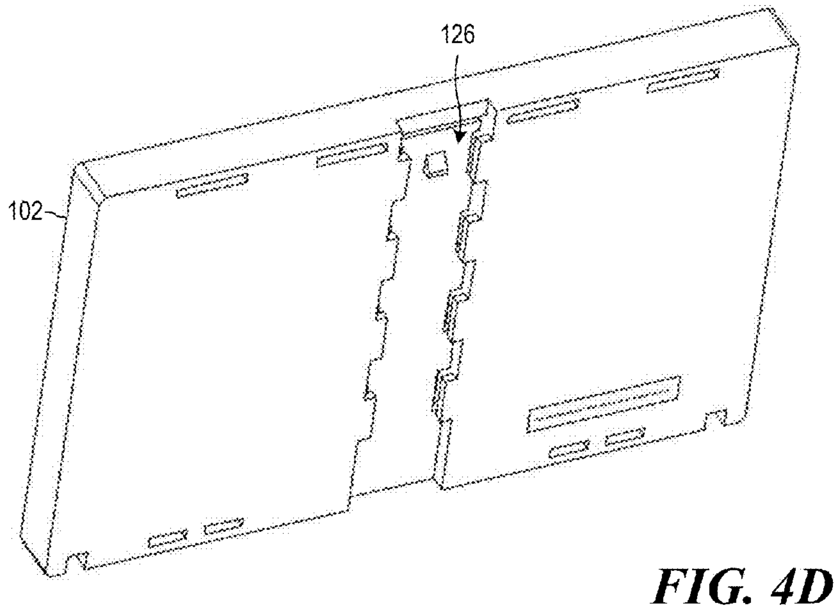

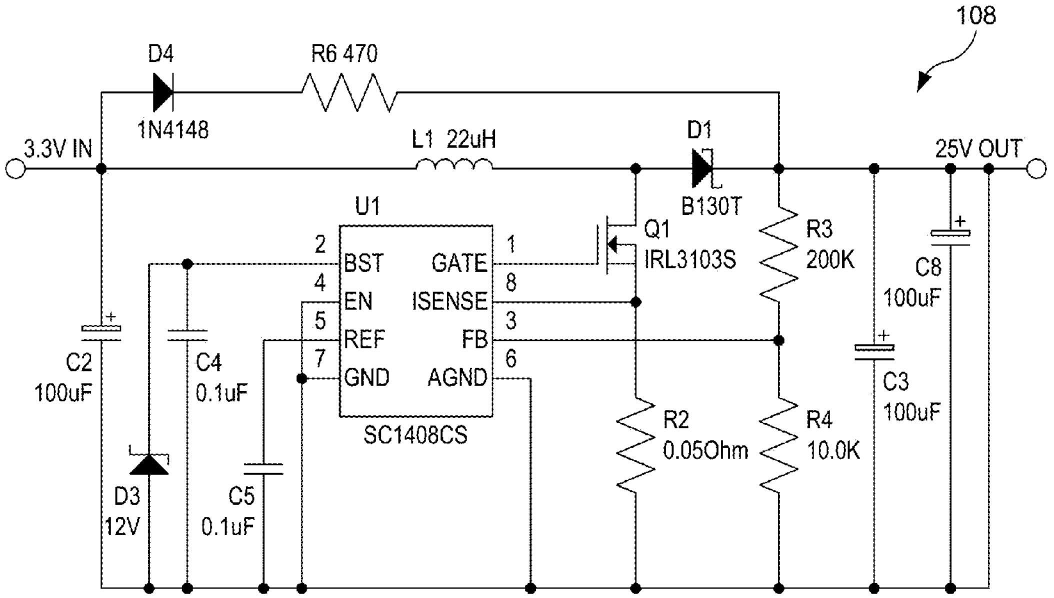
FIG. 3
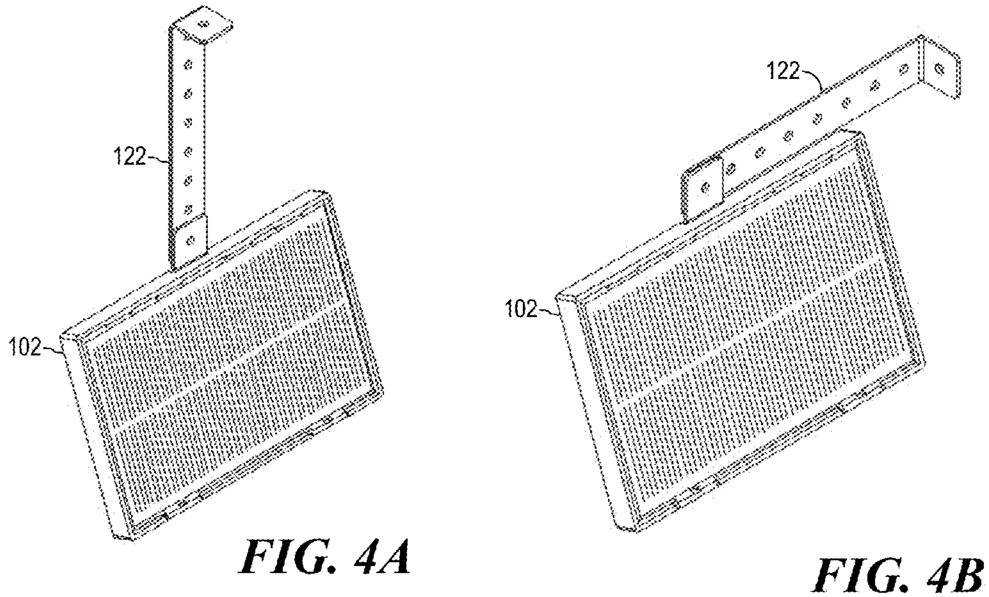
FIG. 4A
FIG. 4B

SOLAR-POWERED WINDOW COVERING AUTOMATION SYSTEM

CROSS-REFERENCE TO RELATED APPLICATIONS

This application relates to, and claims the benefit of the filing date of, co-pending Australian provisional patent application serial no. 2007906910 entitled Solar-powered window covering automation system, filed Dec. 17, 2007, the entire contents of which are incorporated herein by reference for all purposes.

FIELD OF INVENTION

This invention relates to window coverings, specifically to a device for the motorized, automatic operation of drapery, roller blinds and similar window coverings.

BACKGROUND

Description of Related Art

Prior Approaches for Motorized and Automatic Operation

Benefits of Automatic or Motorized Operation

Automation of window coverings can provide substantial benefits in increased convenience and utility. In residential applications, automatic operation can save considerable time and effort, especially when many drapery and blinds need to be operated, when they are heavy or when they are mounted in hard-to-reach locations. For the physically-challenged, automatic operation of window covering can provide a meaningful improvement in the ability to independently control the living environment. In commercial applications, automatic operation can help save energy, improve security and it can offer protection from damaging UV rays.

Cost Constraints

However, widespread automation of window coverings will not be practical unless the cost of automation is affordable to majority of end users. This cost includes two primary components: purchase cost of the automation equipment and installation costs. In most applications, automation will not be cost-effective if the sum of these costs substantially exceeds the purchase cost of conventional window coverings. The mechanical installation of a motorized system does not involve substantially more effort in installation than that of a non-motorized system. If the cost of the automation equipment is affordable, the resulting overall cost makes motorization of window coverings a real alternative to manually operated or previous automated systems for window coverings.

Solar-Powered Systems

One common disadvantage with previous systems is the need to connect wiring during installation. Some automatic window coverings attempt to avoid this disadvantage by using a solar-charged battery as a power source. Such power source has been either too small, resulting in insufficient energy collection to operate most window coverings, or too large in physical size due to the requirements for a higher voltage. A power source with minor energy collection is limited by its capacity and can only be used for those systems that require minimal power, such as pleated shades and rotation systems of Venetian blinds. Most window covering automation systems require the power source to supply voltage at a level of 12V or 24V. The size of solar panel needed is hence relatively large, in order to generate such voltage as well as to charge batteries. Previous systems also required multiple batteries in series to generate a total of 12V or 24V. Automation systems with a 12V or 24V standby voltage tend to have a high leakage current, which in turn sets higher requirements for the capacity of the power source. Therefore, the larger size of the solar panel, together with multiple batteries, results in a bulky power source with inconvenient installation and higher material costs.

OBJECTS AND ADVANTAGES OF THE INVENTION

Several objects and advantages of the present invention are:

1. to provide systems for the automatic operation of window coverings with no requirements of wiring power from mains electricity, while eliminating the need for maintenance procedures such as changing the battery; and to provide an environmentally friendly product.

2. to provide automation systems which are simple and inexpensive to manufacture. With controls, motor and battery integrated inside one unit, the entire system becomes efficient and uncomplicated; easy for installation and operation.

3. to provide systems with complete solutions for the needs of the majority of window covering automations. The systems are all integrated with an RF remote control receiver and low voltage control port for accessibility via various means of modern controls.

4. to provide a cost effective solution for window covering automation and make automation affordable to ordinary consumers, with the aim of increasing popularity of window covering automation.

SUMMARY OF THE INVENTION

These and other advantages are achieved in accordance with an embodiment of the present invention including a system for motorized operation of window coverings, which has a head-rail, an actuator and a solar panel, the solar panel being characterized by being a photovoltaic device which generates electrical energy when receiving light, the electrical energy provided by said photovoltaic device being the only source of energy provided for operation of said system.

The uniqueness of this invention also includes its advantageous combination of the special design of the electronic circuitry with the motor technology. Specifically, this includes (1) the booster circuit, which makes it possible to increase voltage and amperage from small solar panels to the level required for the motor to operate, and (2) the timing management, which makes it possible to provide this energy at the exact point in time that the motor is called upon to operate. This permits the compact design of the batteries and the ability to provide sufficient charge and adequate ongoing replenishment from small solar panels. Without this invention, large solar panels and large batteries would be needed to power the operation of the motor.

Further objects and advantages are to provide a system which is easy to use, which is capable of both manual and automatic operation, and which can also be operated by remote control. Still another object and advantage is to provide a system which can be adapted for use with other window coverings. Other objects and advantages will become evident from consideration of the drawing and accompanying descriptions.

DESCRIPTION OF DRAWING FIGURES

Figure 1:
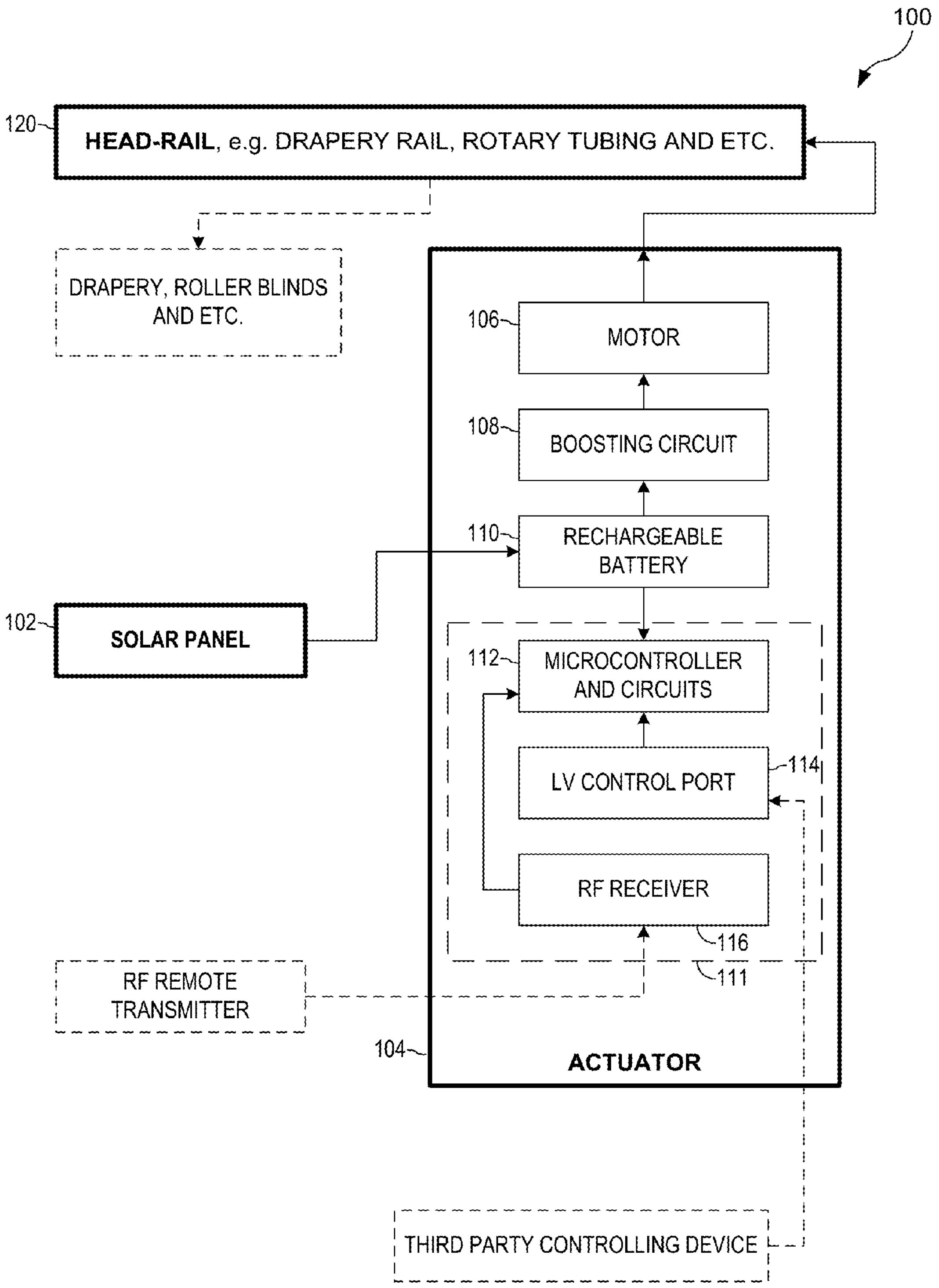

FIG. 1 is a block diagram depicting a framework of a solar-powered window covering automation system 100. The solar panel 102 collects energy from sunlight and converts sunlight to electrical power, further charging the rechargeable battery 110 inside of the actuator 104. The battery 110 provides power to the standby circuit 111 when the system is in standby mode. It also provides power to the boosting circuit 108 when system needs to operate. Operation orders may be sent through a radio frequency (RF) receiver 116 or a low-voltage (LV) control port 114 to the microcontroller 112 that then translates the signals to execute these orders, directing the motor 106 and output members 120 to operate the system accordingly.

Electrical Configuration of Subject Invention

Figure 2A:
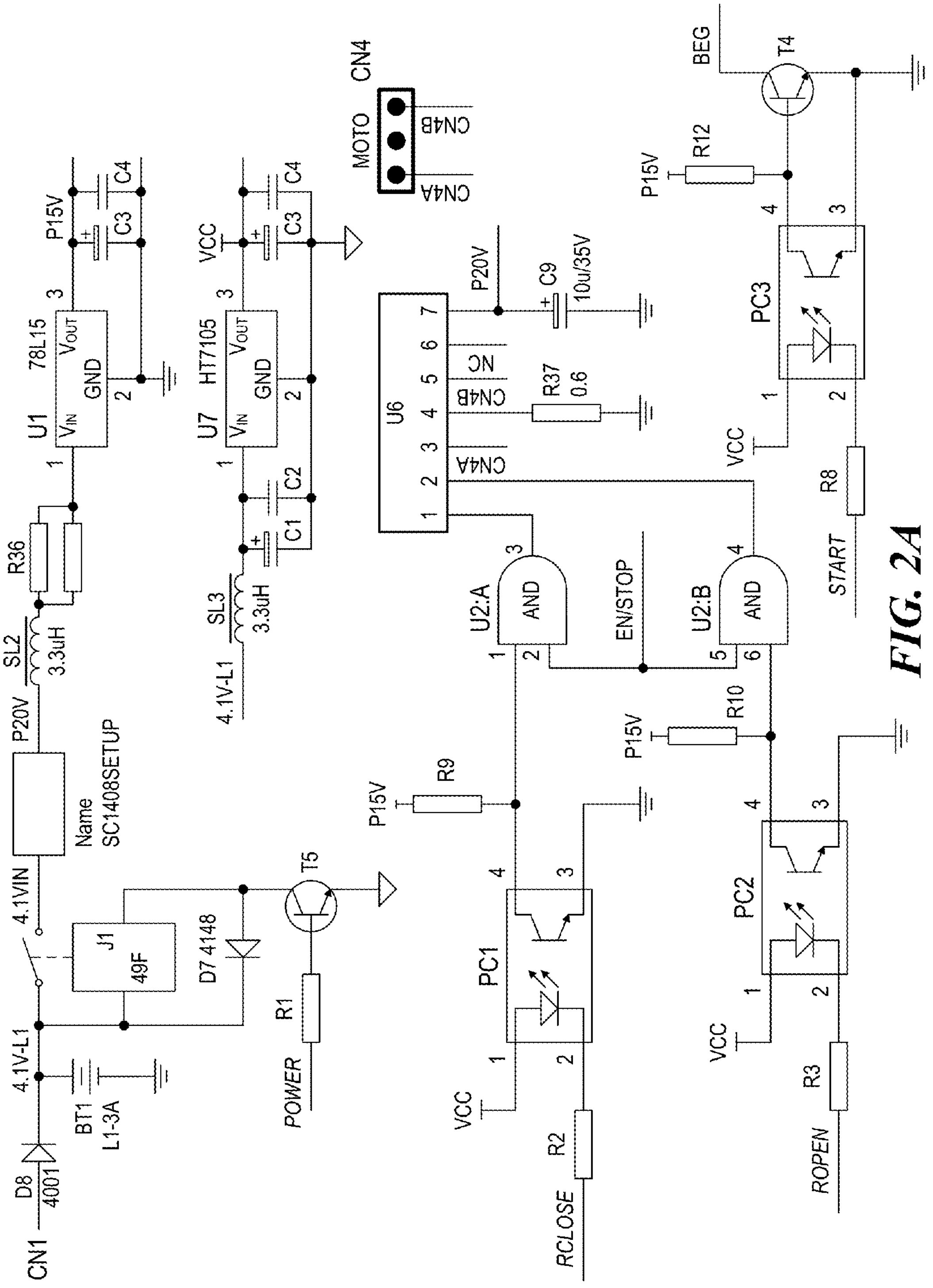
Figure 2B:
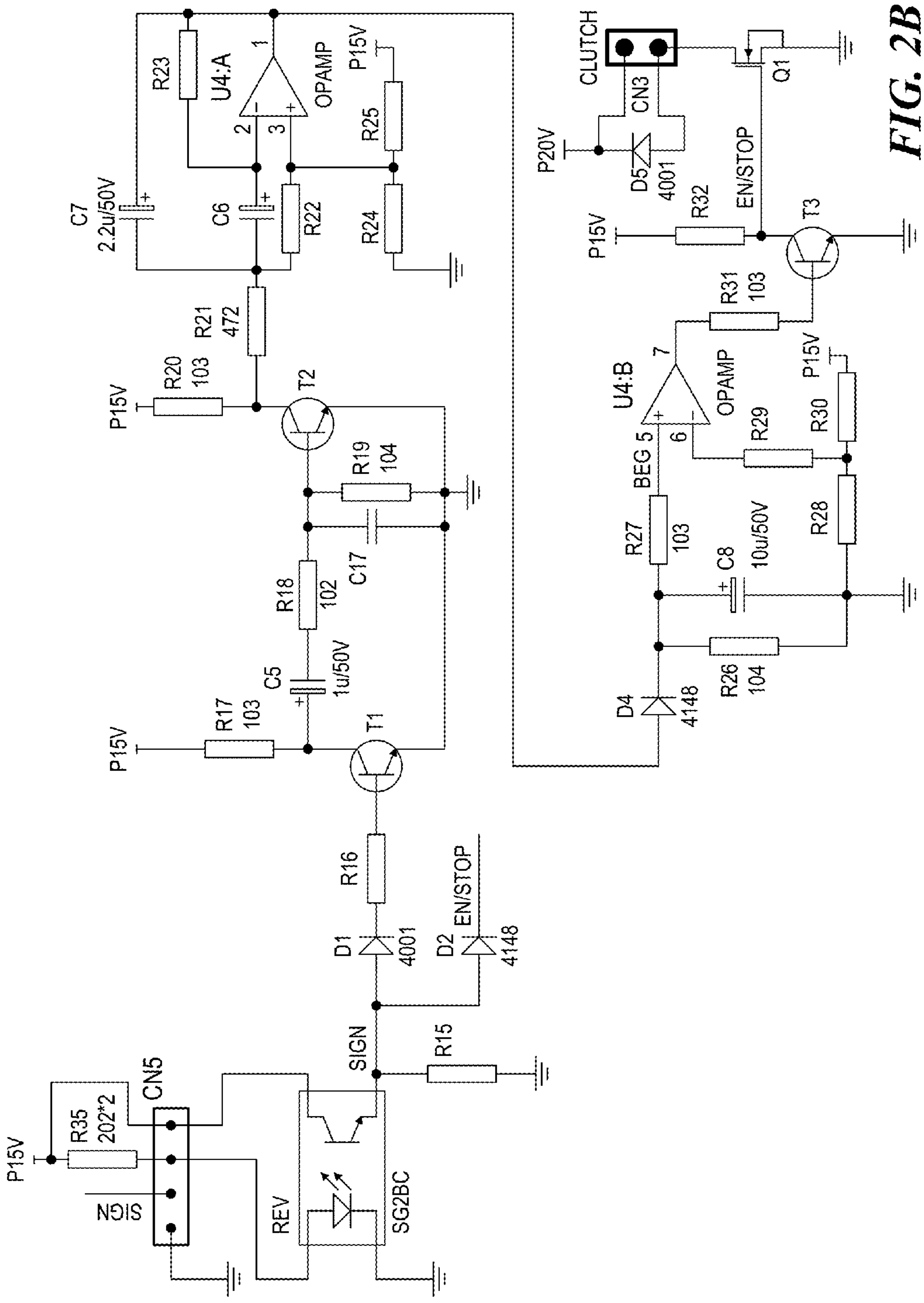
Figure 2C:
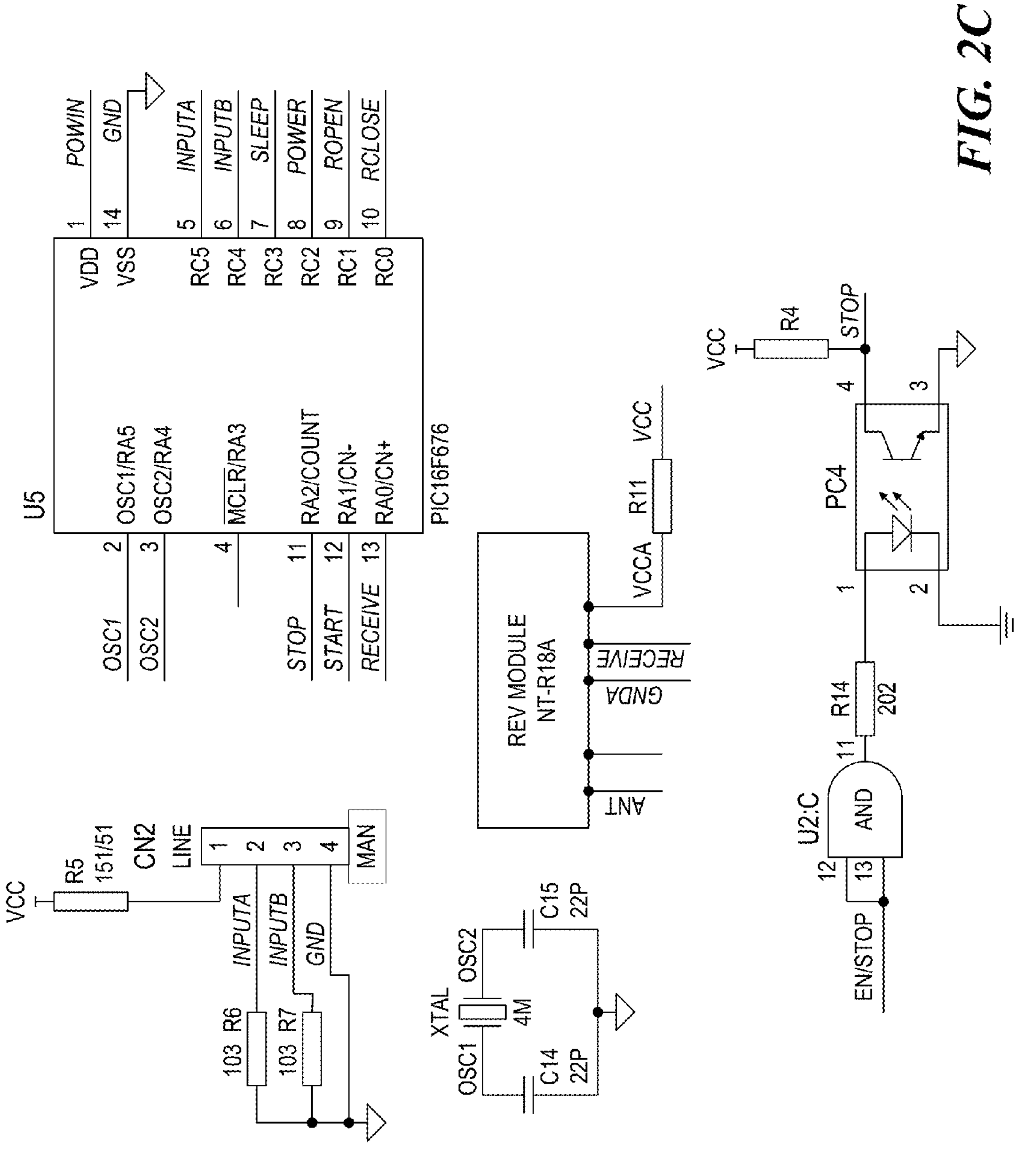

FIG. 2 shows a schematic diagram of a basic version of a solar-powered, wireless, automatic, window covering control system according to the subject invention. Practitioners in the art will recognize the electrical configuration of system as being essentially that of a conventional microcontroller-based control system, with control by means of momentary-contact switches and radio frequency (RF) signals, and powered by a solar-charged battery. These elements are well-known in the art and used in a variety of commercially available products. Therefore, many aspects of FIG. 2 will be familiar to those knowledgeable in the art, and these aspects will be only briefly described. The only aspect that may need to be emphasized here is that the components in this diagram should have a character for low electrical leakage. During standby mode, total leakage current should not exceed 2.5 mA. Firmware will manage receiving signals, assigning the signal coding, manage executing, detecting system states and timing management. Thus, the standby circuit (111, FIG. 1) comprises an RF receiver (116, FIG. 1) and a microprocessor (112, FIG. 1) arranged as to receive input signals from said RF receiver and/or a low voltage port (114, FIG. 1) to control operation of said motor in response thereto, said standby circuit being operated at the voltage of a rechargeable battery having a nominal working voltage between 3.5V to 3.8V, so that said standby circuit consumes minimum energy and conserves energy stored by said battery due to working at a low voltage level. The rechargeable battery can conveniently be a lithium ion battery.

The firmware has been written with an Assembler which takes a minimum of memory space and has fewer requirements for the EPROM chip, which further reduces overall costs of the system. Practitioners in the art will be familiar with the basic features that a microcontroller needs to perform for such a control system. One thing that leads to a unique feature is the "learning" method of the invention. A common issue with prior approaches in RF remote control window covering automation is that, during activating the communication (setting controlling channel between the transmitter and actuator), the other systems installed within the range of the transmitter may also get activated on the same channel, as they are in the same receiving mode. To avoid other motors being activated, the installer needs to get all other motors within range to power off. In order to separate the one that needs to be activated and other systems that should not, the invention has been designed in such a way that a motor can only be activated to the communication setting within a limited time after powering up the actuator. That is, the system including a wireless RF transmitter also includes a circuit for distinguishing a particular channel of said transmitter from channels of other transmitters, the particular channel being a setting between the actuator of said system and the transmitter. To avoid inadvertently setting other systems within range of the system intended to be set, said setting can only be established by sending a specific signal from said transmitter to said actuator within a limited time of initial power on of said actuator. Thus, even if the other motors and systems are "on" during setting the channel of the system to be set, the other systems will not be unintentionally reset.

FIG. 3 shows a power management circuit, or boosting circuit 108, which boosts the lower level of voltage (single-cell battery voltage level) to the voltage level required by the motor, for example, 24V. In order to have adequate power for driving the system, the boosting circuit needs to have sufficient current output. An output current of 800 mA has been achieved in this invention. Consideration must be given to the efficiency of this circuit as its task is mainly to translate the power from the battery to the requirement of the motor. To maximize battery capacity for use in driving the system, the boosting circuit limits loss of energy in voltage amplification to a very low or negligible value. For example, inductor L1 can be built with high performance material having low hysteresis and low impedance to achieve optimum overall efficiency of the boosting circuit.

FIG. 4 depicts photovoltaic sources 102 with support members 122 and 124 that can be installed in various ways near proximity of a window. FIG. 4*a* shows the way of how to mount the panel 102 on top of the window frame. FIG. 4*b* is for side mounting. FIG. 4*c* is for standing mounting. FIG. 4*d* shows the back of solar panel 102 and slot 126 where the mounting bracket can slide in and be clip fixed. FIG. 4*e* is the mounting bracket 122 and FIG. 4*f* is the panel holding bracket 124.

Selection of Battery

With the system in standby mode, maximum current leakage is limited to 2.5 mA. With the system in operation, the current being pulled out of the battery is approximately 5,000 mA. Total daily consumption of electrical power by the system is roughly calculated by: (2.5 mA×24 h)+(5,000 mA×0.008 h)=100 mAh. A fully charged 2,500 mAh battery would provide power for 25 days under such a typical system utilization. A Lithium-ion 3.7V, 2,500 mAh, 6 A high performance battery can be used in this invention.

Selection of Solar Panel

If daily consumption of electrical energy by a window covering automation system is about 100 mAh, the charging capability from the solar panel needs to be at least equivalent to this average value to be sufficient. Extensive experiments have found that there are large variations depending on time of a day, direction of panel orientation, and the weather. A 200 mA, 7V photovoltaic solar panel has been selected in this invention. This solar panel is more than sufficient for the windows that are sun facing. Two such panels are usually sufficient for the windows on the opposite side. A minimum of 25 mA charging current is required between 11 am and 3 pm on a fine day. When required, multiple panels can be easily installed and linked in parallel.

What is claimed is:

1. A system for motorized operation of window coverings, comprising:

an actuator;

a solar panel, the solar panel comprising a photovoltaic device which generates electrical energy when receiving light; and a circuit operable by a wireless RF transmitter, the circuit comprising means for distinguishing a particular channel of the transmitter from channels of other transmitters, the particular channel being a setting between the actuator of the system and the transmitter, wherein the setting can only be established by sending a specific signal from the transmitter to the actuator within a limited time of initial power on of the actuator.

2. The system of claim 1, wherein said actuator comprises a rechargeable battery, motor, motor output members and an electrical circuit board, the electrical circuit board having a standby circuit and a boosting circuit.

3. The system of claim 2, wherein the standby circuit comprises an RF receiver and a microprocessor arranged as to receive input signals from the RF receiver and/or a low voltage port to control operation of the motor in response thereto, the standby circuit being operated at the voltage of a rechargeable battery having a nominal working voltage between 3.5V to 3.8V, so that the standby circuit consumes minimum energy and conserves energy stored by the battery due to working at a low voltage level.

4. The system of claim 2, wherein the boosting circuit is a power management circuit which converts voltage level of the rechargeable battery to the level required of the motor and output members, and wherein the boosting circuit is only activated when a signal is received by the system to move window covering materials.

5. The system of claim 1, wherein the electrical energy provided by the photovoltaic device is the only source of energy provided for operation of the system.

6. The system of claim 2, wherein the electrical energy provided by the photovoltaic device is the only source of energy provided for operation of the system.

* * * * *